UNITED STATES PATENT OFFICE.

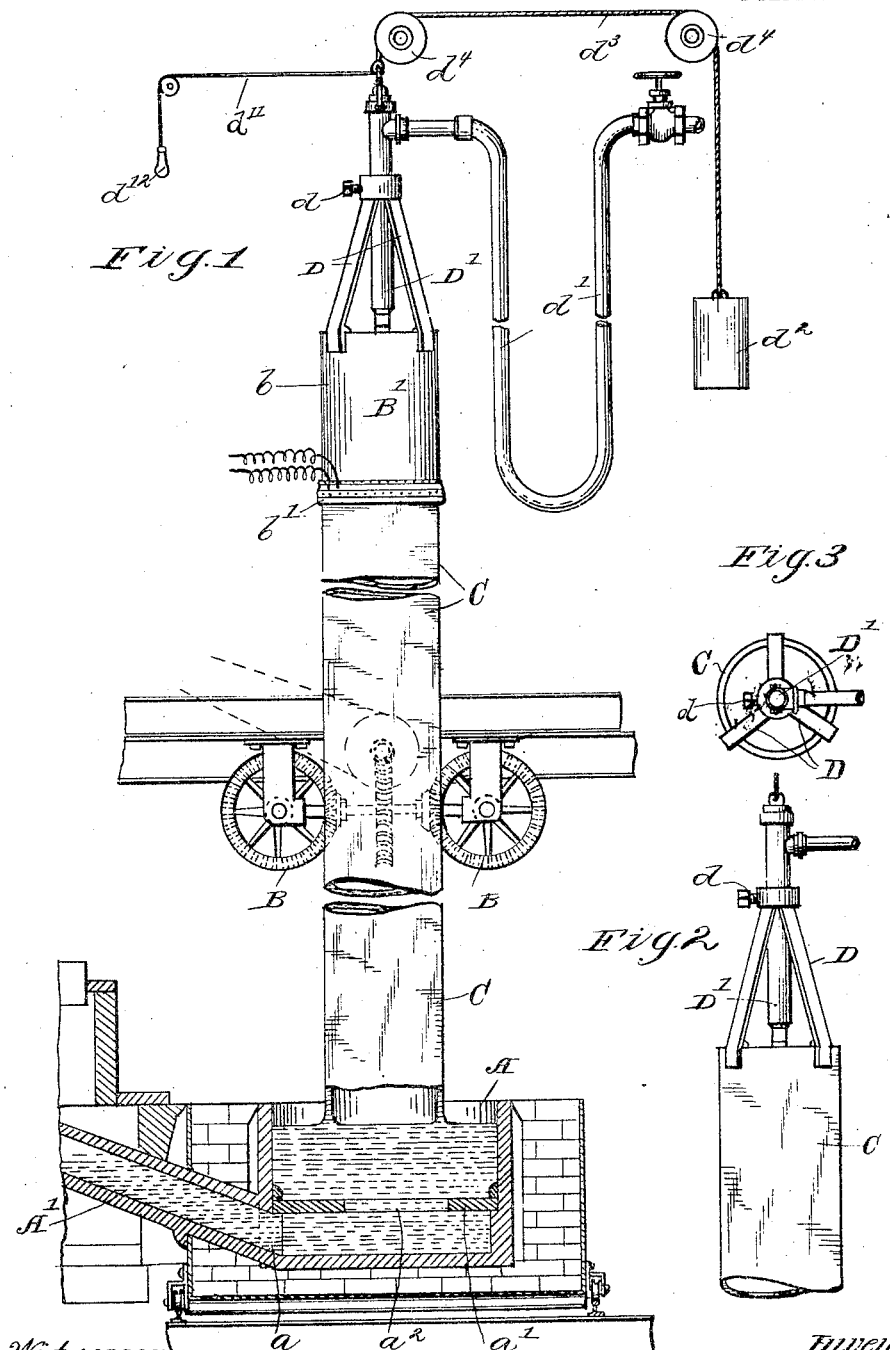

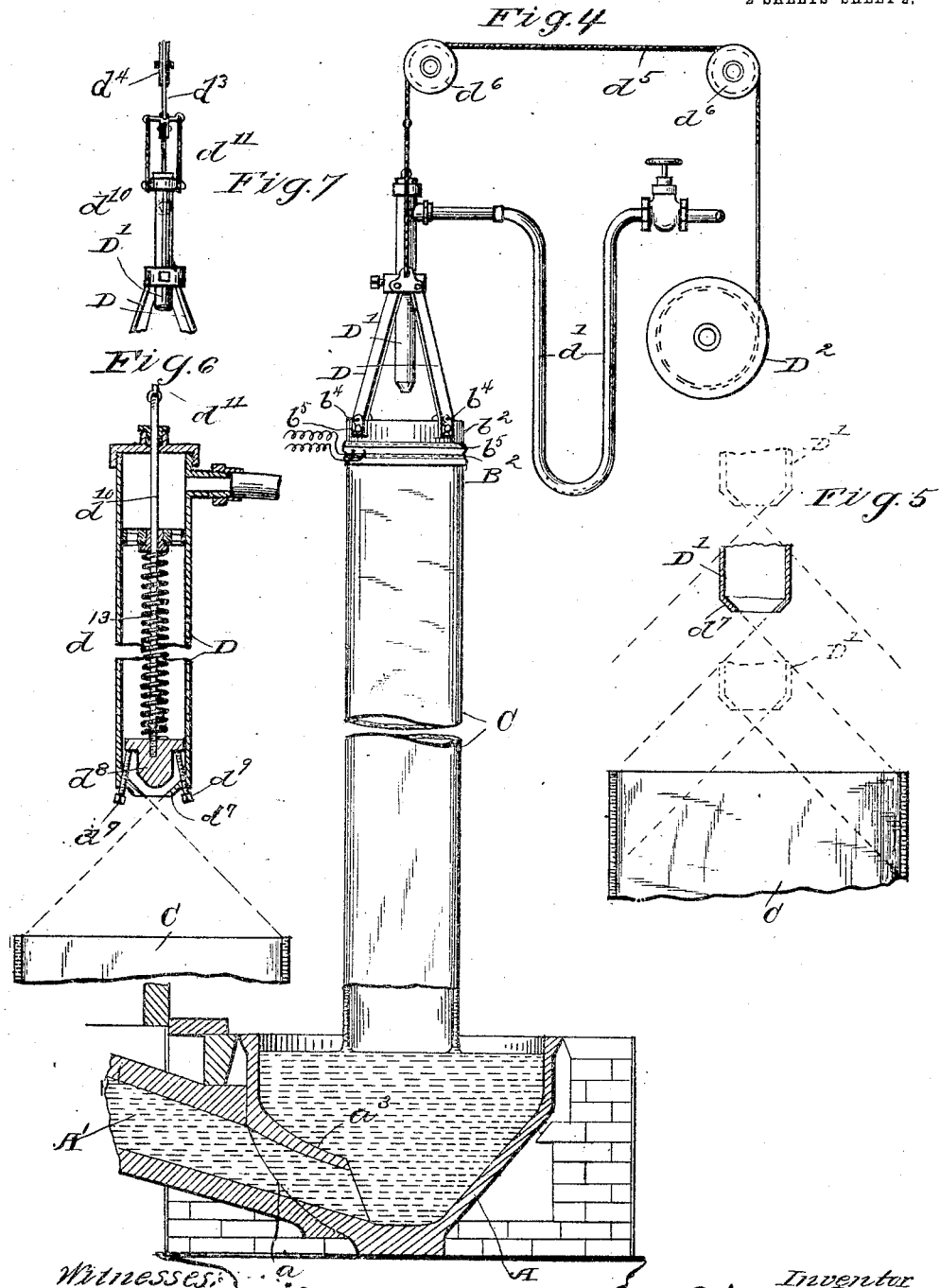

ROBERT L. FRINK, OF CLEVELAND, OHIO.

METHOD OF AND APPARATUS FOR DRAWING GLASS.

1,071,727. Specification of Letters Patent. Patented Sept. 2, 1913.

Application filed August 3, 1908. Serial No. 446,582.

*To all whom it may concern:*

Be it known that I, ROBERT L. FRINK, a citizen of the United States, resident of Cleveland, county of Cuyahoga, and State of Ohio, have invented a new and useful Improvement in Methods of and Apparatus for Drawing Glass, of which the following is a specification, the principle of the invention being herein explained and the best mode in which I have contemplated applying that principle, so as to distinguish it from other inventions.

The present invention, relating as indicated to drawing glass, is designed more particularly for the drawing of hollow glass articles, such as the cylinders from which window glass is made.

Said invention has as its object the control of the supply of air to such cylinder pending the drawing operation and to this end comprehends a novel method and means for use therein for thus supplying such air. I speak of the operation involved as being that of "supplying" air to the cylinder, this being the term heretofore regularly applied. More properly, however, as will appear from the sequel, we should speak simply of maintaining a volume of air within the cylinder, since, as a matter of fact, it is more or less uncertain whether the pressure within a cylinder being drawn is greater than atmospheric, equal to atmospheric or even less than atmospheric. Indeed, I am led to believe from my experiments that any or all of these various conditions of pressure may obtain at one time or another in the course of the drawing of a single roller, a factor of determining character, but one generally neglected in discussing the drawing of glass cylinders, being the surface tension, or viscosity, of the metal in the bath. I should, hence, prefer to refer to the present method and apparatus as a method and apparatus for maintaining within the cylinder a volume of air under such conditions of pressure, or absence of pressure, as is necessary to maintain the roller or cylinder, being drawn of the proper diameter and its walls of the proper thickness.

To the accomplishment of the above and related objects, said invention then comprises the steps and means hereinafter fully described and particularly pointed out in the claims.

The annexed drawings and the following description set forth in detail certain means and modes of carrying out the invention, such disclosed means and modes illustrating, however, but one of various ways in which the principle of the invention may be used.

In said annexed drawings: Figure 1 is a partial side elevation and partial section of one form of glass drawing apparatus adapted to the carrying out of my improved method; Fig. 2 is a similar view of a part of such apparatus, showing a variation in the disposition of parts; Fig. 3 is a plan view of the parts in question; Fig. 4 is a view corresponding to Fig. 1, but showing an alternative form of pot construction and a modified form of the air supply apparatus; Fig. 5 is a sectional view of a detail of such last named apparatus; Fig. 6 is a similar sectional view of a modified form of such detail, and Fig. 7 is an elevational view of another detail of the first apparatus.

Referring first of all to the several forms of apparatus which are illustrated in the foregoing drawings, before discussing more particularly the method involved in their operation, it is to be remarked that the glass melting furnace, or its equivalent, from which the molten glass is supplied for the drawing operation has not been shown, its character being a matter of indifference. The drawing pot or receptacle A, however, with which the apparatus in hand is more particularly associated appears both in Fig. 1 and Fig. 4, communication being had between the furnace and such pot through a passage or conduit A', as shown. It will be understood that a suitable gate or like means is interposed in such passage whereby the flow of the metal may be stopped when desired. As has been indicated, alternative forms of pot construction are illustrated in the two figures named. In the first, Fig. 1, the drawing pot is of general cylindrical form, being provided on one side with an inlet opening $a$ wherewith the conduit A' leading from the furnace is connected. Suitably supported in the pot just above the inlet opening in question is a horizontal partition $a'$ provided with an aperture $a^2$ through which the molten glass flowing in from the conduit may escape into the upper portion of the pot. Aperture $a^2$ is located off center with respect to the pot, and hence with respect to the cylinder to be drawn therefrom, so as to cause the fresh molten glass to flow through substantially equal distances in order to reach different points in the circle defining the cylinder's base, thus permitting the metal to cool in a substantially equal amount and preserving a uniform consistency thereof at the point of drawing. This method of drawing glass is more fully set up in a pending application, Serial No. 439,767, filed June 22, 1908, and the particular apparatus just described is similarly set up in a pending application, Serial No. 445,077, filed July 24, 1908. In the form of pot illustrated in Fig. 4, the same result is attained by providing the lateral inlet or opening $a$ in the drawing receptacle with an over-arching projection $a^3$ so disposed as to conduct the metal flowing in from the conduit to substantially the lower central portion of the pot, the location of the point of discharge being such that, as before, in arising to different points in the circle defining the cylinder base, the metal will have cooled a substantially uniform amount.

For actually drawing the cylinder or roller I again show alternative forms of apparatus. In Fig. 1, such drawing apparatus proper comprises rolls B, shown as being two in number, located directly above the drawing pot. The cylinder C being drawn is pressed between these rollers and drawn upwardly thereby continuously, once it has been started. Such starting is effected by the use of a bait B' consisting of a hood $b$ of elongated cylindrical form and with an electrically heated annular portion $b'$ at its lower end, by which undue cooling of the surface which comes directly in contact with the glass of the cylinder, may be avoided. This bait likewise forms the subject matter of separate applications, Serial No. 373,217, filed May 13, 1907, and Serial No. 497,274, filed May 20th, 1909. The several portions $b$ $b'$ of the bait being of substantially the same diameter as the cylinder, such bait can be introduced between the rolls and drawn upwardly just as though it were an integral part of the cylinder. With this type of drawing apparatus and bait, the drawing operation, as has been indicated, is intended to be continuous, successive sections being severed from the upper portion of the rising cylinder and removed for the subsequent operations pertaining to the manufacture of window glass. Obviously, then, the bait is employed only at the initial stage of the operation.

For maintaining the necessary volume of air within the cylinder being drawn, where the drawing is effected by the means just described, the apparatus appearing in the upper portion of Fig. 1 is provided. Such apparatus comprises simply a support D in the form of a tripod adapted to removably rest upon the upper end of the bait B', or of the cylinder C (Fig. 2) after the first section of the cylinder including the bait has been severed and removed. In the head of support D is clamped by means of a set screw $d$ or the like, a short pipe D', disposed in axial alinement with the cylinder C. Such pipe is adapted, by reason of the manner in which it is held in the support, to be secured with its lower discharge end at any desired distance above the open end of the cylinder and is connected at its upper end with a suitable source of air pressure through a flexible hose $d'$. Tripod D, pipe D', and so much of the air connection $d'$ as may be supported therefrom, are designed to be approximately but not quite counterbalanced by means of a weight $d^2$ connected therewith by a cord $d^3$ passing over the pulleys $d^4$. It will thus be seen that the apparatus under consideration will remain in place upon the upper end of the cylinder without, however, adding unduly to the burden sustained by the drawing rollers B.

The details of construction of the air discharge pipe will be noted presently, attention being first directed, however, to the alternative form of air supply apparatus shown in Fig. 4. In the apparatus shown in this figure, the drawing is designed to be accomplished directly through the medium of a bait $B^2$, and not by means of drawing rollers as in Fig. 1, successive cylinders of a predetermined length being drawn by successive operations of the bait, instead of a single cylinder of indefinite length, as in the other instance. The bait $B^2$ here is of substantially the same construction as that previously shown, save that the cylindrical portion $b^2$ is of reduced length, and the support D for the air supply pipe D' is adapted to be fixedly secured thereto, as by means of clips $b^4$ that engage pins $b^5$. Such support, moreover, instead of being simply counterbalanced, is connected with suitable hoisting mechanism comprising a cord $d^5$ passing over pulley $d^6$ and connected at its other end with a winding-drum $D^2$. Air supply connections $d'$ of the same sort as before are connected with the upper end of the pipe D', which is adjustably secured in the head of the tripod support D, likewise as before. Adverting then to the detailed construction of the air supply pipe D', it will be noted that two illustrative forms are shown in Figs. 5 and 6 respectively. In such first form the lower end $d^7$ of the pipe is simply beveled inwardly, the lines of the beveled portion intersecting at approximately 90 degrees. The jet of air discharged from such pipe will accordingly assume a conical form, and, depending upon its relation to the upper end of the glass cylinder C, will have a varying effect upon the volume of air therein. Thus in the position shown in full lines in Fig. 5, where the outer edge of the jet just grazes the edge of the cylinder, the pressure within the cylinder will be scarcely affected, but simply the volume maintained undisturbed by accessions of air at its upper end as the cylinder is drawn upwardly. If, instead, the pipe end or nozzle $d^7$ occupy the lower of the two dotted positions shown in said figure of reference, an increase in pressure will be effected although still without disturbing the body of air in the lower portion of the cylinder, simply a stream of air being discharged into the open end, the excess of which flows upwardly and out. On the other hand, by raising the pipe end to the upper of the two dotted positions, a distinct suction effect may be obtained, thereby securing a negative pressure, or slight vacuum, within the cylinder. It has been previously explained how that under varying circumstances these several effects may be required in order to properly maintain the diameter of the cylinder and a uniform thickness of its walls. However, in the normal operation of the apparatus it is contemplated that the position of the nozzle first described above will be the one utilized, in which the jet functions presumably as a sort of stopper or shield preventing the disruption of the body of air in the cylinder by currents and eddies, as would otherwise be the case. In other words, such air jet provides an adjustable air supply at the top of the cylinder that is automatically responsive to changes in the pressure exerted by the volume of air already in the cylinder.

In the other form of nozzle, illustrated in Fig. 6, the variation consists in the introduction of a plug $d^8$ within the nozzle or discharge end of the pipe, so that an annular discharge orifice is formed. Such plug is adjustably supported in the discharge orifice by set screws $d^9$, and is further rendered longitudinally movable within the pipe, being connected with a rod $d^{10}$ to the upper end of which a cord $d^{11}$ is attached, so that by pulling upon a handle $d^{12}$, see Fig. 1, said plug may be raised to a predetermined height within the pipe. A coil spring $d^{13}$ surrounding said rod normally tends to return the plug $d^8$ to its lower position in contact with set screws $d^9$.

In operation, whichever form of air supply pipe is employed, adjustment of the pipe D' within its support D is preliminarily made to secure the proper effect, as has been described, upon the air volume confined in the cylinder, and the drawing operation then proceeded with in the usual fashion, the support for the supply pipe being lowered onto the second section when the first has been removed in the case of the continuous drawing operation, and being lowered with the bait down to the bath for drawing successive sections in the case of the discontinuous operation. With the adjustable plug type of air supply pipe, by raising or lowering the plug the angle of diversion of the jet of air may be varied so as to secure a certain degree of variation in the effect that the air discharge has on the volume of air in the cylinder, independently of the vertical adjustment of the pipe. This construction will be of particular use where the cylinder is drawn continuously, since, when a section has been severed and removed, the air supply apparatus, will be temporarily left in an elevated position with respect to the remaining cylinder portion; under such circumstances the air blast can be modified in the manner referred to by simply pulling on handle $d^{12}$, until opportunity can be taken to lower the apparatus onto the cylinder again; thereupon the plug $d^8$ is allowed to return to its normal position.

Other modes of applying the principle of my invention may be employed instead of the one explained, change being made as regards the means and the steps herein disclosed, provided those steps by any one of the following claims or their equivalents be employed.

I therefore particularly point out and distinctly claim as my invention:

1. The method of producing hollow glass articles which consists in drawing an uncapped open ended cylinder from a bath of molten glass and maintaining a body of air therein by a jet of pressure fluid projected toward the open end of the cylinder.

2. The method of producing hollow glass articles, which consists in drawing a cylinder from a bath of molten glass, the end of the cylinder being open during the drawing operation, and maintaining a body of pressure fluid within the cylinder by a jet of pressure fluid projected toward the open end of the cylinder.

3. The method of producing hollow glass articles, which consists in drawing an open-ended cylinder from a bath of molten glass, and simultaneously directing a stream of air on the open end of said cylinder.

4. The method of producing hollow glass articles, which consists in drawing an open-ended cylinder from a bath of molten glass, and simultaneously directing a stream of air in the form of a jet on the open end of said cylinder.

5. The method of producing hollow glass articles, which consists in drawing an open-ended cylinder from a bath of molten glass, and simultaneously directing a stream of air in the form of a hollow conical jet on the open end of said cylinder.

6. The method of producing hollow glass articles, which consists in drawing an open-ended cylinder from a bath of molten glass, and simultaneously directing a stream of air on the open end of said cylinder, such stream being adjusted with respect to the edge of the cylinder end, substantially as described.

7. The method of producing hollow glass articles, which consists in drawing an open-ended cylinder from a bath of molten glass, and simultaneously directing a stream of air in the form of a jet on the open end of said cylinder, such jet being adjusted with respect to the open end of the cylinder, substantially as described.

8. The method of producing hollow glass articles, which consists in drawing an open-ended cylinder from a bath of molten glass, and simultaneously directing a stream of air in the form of a jet onto the open end of said cylinder, such jet being adjusted so as to graze the edge of the cylinder end, substantially as described.

9. In apparatus of the class described, the combination of a drawing pot or receptacle, mechanism for drawing a cylinder from the molten glass within said receptacle, with the upper end of said cylinder open during such drawing operation, and means for supplying pressure fluid to said cylinder, the said means being supported over, but not closing, the open end of said cylinder.

10. In apparatus of the class described, the combination of a drawing pot or receptacle, mechanism for drawing a cylinder from the molten glass within said receptacle, with the upper end of said cylinder open during such drawing operation, and means for supplying pressure fluid to said cylinder, the said means being supported over and movable in unison with the cylinder, but not closing the open end thereof.

11. In apparatus of the class described, the combination of a drawing pot or receptacle, mechanism for drawing a cylinder from the molten glass within said receptacle, with the upper end of the cylinder open during such drawing operation and means for supplying pressure fluid to said cylinder, the said means being adjustably supported over, but not closing the open end of said cylinder and movable in unison with said cylinder.

12. In apparatus of the class described, the combination of a drawing pot or receptacle, mechanism coöperative therewith adapted to draw an open-ended cylinder of indefinite length from molten glass therein, and air supply means supported over but not closing the open end of said cylinder.

13. In apparatus of the class described, the combination of a drawing pot or receptacle, mechanism coöperative therewith adapted to draw an open-ended cylinder of indefinite length from molten glass therein, and air supply means supported over but not closing the open end of said cylinder and movable in unison therewith.

14. In apparatus of the class described, the combination of a drawing pot or receptacle, mechanism coöperative therewith adapted to draw an open-ended cylinder of indefinite length from molten glass therein, and air supply means adjustably supported over the open end of said cylinder and movable in unison therewith.

15. In apparatus of the class described, the combination of a drawing pot or receptacle, mechanism coöperative therewith adapted to draw an open-ended cylinder from molten glass in said receptacle, a pipe supported in axial alinement with said cylinder above, but not closing the open end of the same, said pipe being movable in unison with said cylinder, and an air-supply connected with said pipe.

16. In apparatus of the class described, the combination of a drawing pot or receptacle, mechanism coöperative therewith adapted to draw an open-ended cylinder from molten glass in said receptacle, a pipe supported in axial alinement with said cylinder above the open end of the same, said pipe being movable in unison with said cylinder, and an air-supply connected with said pipe, the lower end of said pipe being constructed to discharge the air in the form of a jet on the open end of said cylinder.

17. In apparatus of the class described, the combination of a drawing pot or receptacle, mechanism coöperative therewith adapted to draw an open-ended cylinder from molten glass in said receptacle, a pipe supported in axial alinement with said cylinder above the open end of the same, said pipe being movable in unison with said cylinder, and an air-supply connected with said pipe, the lower end of said pipe being constructed to discharge the air in the form of a hollow conical jet on the open end of said cylinder.

18. In apparatus of the class described, the combination of a drawing pot or receptacle, mechanism coöperative therewith adapted to draw an open-ended cylinder from molten glass in said receptacle, a pipe disposed in axial alinement with said cylinder above the open end of the same, means for thus supporting said pipe at an adjustable distance above such cylinder end and so as to be movable in unison therewith, and an air supply connected with said pipe.

19. In apparatus of the class described, the combination of a drawing pot or receptacle, drawing rolls disposed above said receptacle and adapted to draw an open-ended cylinder of indefinite length from molten glass therein, a pipe removably supported over the open end of said cylinder, but not closing same and in axial alinement therewith, and an air supply connected with said pipe.

20. In apparatus of the class described, the combination of a drawing pot or receptacle, drawing rolls disposed above said receptacle and adapted to draw an open-ended cylinder of indefinite length from molten glass therein, a support removably mounted upon but not closing the open end of said cylinder, a pipe adjustably secured in said support in axial alinement with said cylinder, and an air supply connected with said pipe.

21. In apparatus of the class described, the combination of a drawing pot or receptacle, drawing rolls disposed above said receptacle and adapted to draw an open-ended cylinder of indefinite length from molten glass therein, a support removably mounted upon the open end of said cylinder, a pipe adjustably secured in said support in axial alinement with said cylinder, and an air supply connected with said pipe, the lower end of said pipe being constructed to discharge the air in the form of a jet on the open end of said cylinder.

22. In apparatus of the class described, the combination of a drawing pot or receptacle, drawing rolls disposed above said receptacle and adapted to draw an open-ended cylinder of indefinite length from molten glass therein, a support removably mounted upon the open end of said cylinder, a pipe adjustably secured in said support in axial alinement with said cylinder, and an air supply connected with said pipe, the lower end of said pipe being constructed to discharge the air in the form of a hollow conical jet on the open end of said cylinder.

23. In apparatus of the class described, the combination of a drawing pot or receptacle, drawing rolls disposed above said receptacle and adapted to draw an open-ended cylinder of indefinite length from molten glass therein, a support removably mounted upon the open end of said cylinder, a pipe adjustably secured in said support in axial alinement with said cylinder, an air supply connected with said pipe, the lower end of said pipe being beveled inwardly, and a correspondingly beveled plug, centrally mounted in such end, whereby the air is discharged in the form of a hollow conical jet on the open end of said cylinder.

24. In apparatus of the class described, the combination of a drawing pot or receptacle, drawing rolls disposed above said receptacle and adapted to draw an open-ended cylinder of indefinite length from molten glass therein, a support removably mounted upon the open end of said cylinder, a pipe adjustably secured in said support in axial alinement with said cylinder, an air supply connected with said pipe, the lower end of said pipe being beveled inwardly, a correspondingly beveled plug centrally mounted in such pipe, whereby the air is discharged in the form of a hollow conical jet on the open end of said cylinder, and means for adjusting the position of said plug within the pipe to vary the character of such jet, substantially as described.

25. The method of producing hollow glass articles which consists in drawing an open ended article from a bath of molten glass and directing a stream of pressure fluid toward said open end for creating and maintaining the required volume of pressure fluid therein.

26. The method of producing hollow glass articles, which consists in raising from a bath of molten glass, an open ended bait member with the article attached thereto, and directing a jet of pressure fluid toward the upper open edge of said bait member for creating and maintaining a required volume of pressure fluid within the article.

27. The method of producing hollow glass articles, which consists in applying to the open end of said article, a fluid pressure supply, regulating such pressure supply and directing a stream of pressure fluid on the open end of the article to maintain the desired pressure of fluid therein.

28. An apparatus for blowing glass cylinders, comprising in combination, a bait having substantially the same size openings at both ends, and blowing mechanism operating immediately above said open ended bait to supply a current of air directly to the interior of the cylinder attached to said bait.

Signed by me, this 30th day of July, 1908.

ROBERT L. FRINK.

Attested by—
CHRISTINE I. ARUS,
JNO. F. OBERLIN.